United States Patent [19]

Toyoda et al.

[11] Patent Number: 4,847,649
[45] Date of Patent: Jul. 11, 1989

[54] BRAKE DEVICE FOR SHUTTER

[75] Inventors: Yasuhiro Toyoda; Tsuyoshi Fukuda, both of Kanagawa, Japan

[73] Assignee: Canon Kabushiki Kaisha, Tokyo, Japan

[21] Appl. No.: 222,540

[22] Filed: Jul. 21, 1988

[30] Foreign Application Priority Data

Jul. 24, 1987 [JP] Japan ................... 62-185259

[51] Int. Cl.4 .............................. G03B 9/40
[52] U.S. Cl. .......................... 354/252; 354/246
[58] Field of Search ............. 354/246, 248, 249, 250, 354/252

[56] References Cited

U.S. PATENT DOCUMENTS

| | | | |
|---|---|---|---|
| 4,110,773 | 8/1978 | Scholz | 354/252 |
| 4,302,091 | 11/1981 | Harase et al. | 354/252 |
| 4,316,662 | 2/1982 | Tosaka et al. | 354/252 |
| 4,657,366 | 4/1987 | Tanabe et al. | 354/246 |
| 4,692,009 | 9/1987 | Toyoda et al. | 354/246 |

Primary Examiner—A. A. Mathews
Attorney, Agent, or Firm—Fitzpatrick, Cella, Harper & Scinto

[57] ABSTRACT

A brake device for a shutter includes a movable member which moves in association with run of shutter blades, the movable member being capable of being braked to brake run of the shutter blades, and a brake member which is moved in a followed manner by the movable member and which conducts braking. This brake member has a first contact portion which is elastically brought into contact with the movable member, and a second contact portion which is rigidly brought into contact with the movable member after the elastic contact of the first contact portion has started.

9 Claims, 7 Drawing Sheets

BRAKE DEVICE FOR SHUTTER

BACKGROUND OF THE INVENTION

1. Field of the Invention

This invention relates to a brake device for a shutter, and, more particularly to a brake device for stopping run of shutter blades of a focal plane shutter for cameras.

2. Description of the Related Art

An example of a conventional brake device of a shutter will now be described with reference to FIGS. 5 and 6. In this device, a blade driving lever 108 connected to the shutter blades to transmit a driving force to the shutter blades is rotated clockwise, viewed in the figures, around a shaft P so that the shutter blades are made run. Immediately before completion of running of the shutter blades the blade driving lever 108 which can be, as described above, rotated is brought into contact with a brake lever 113 so that the rotation of the blade driving lever 108 is rapidly stopped by the frictional force which is given the brake lever 113. The position at which the blades are stopped is finally determined by stoppage of rotation of the brake lever 113 by abutting a bent and raised portion 113c thereof against a stopper rubber 118. The structure which can cause the brake lever 113 to be rotated under a predetermined frictional state is exemplified in this example by that: the brake lever 113 is sandwiched and held between an upper and a lower brake sheets 119 utilizing spring force from a leaf spring 122 via a fixed plate 120; and thus the rotation under a predetermined resistance can be realized by frictional resistance obtained by the above-described sandwiching and holding. A collar 121 transmits the urging force from the leaf spring 122 as the sandwiching pressure which acts between the frictional surface of the brake lever 113 and that of the brake sheets 119. Furthermore, the outside surface of the collar 121 is arranged to act as a guide rod for a spring 116.

A buffer member 224 formed by an elastic material is interposed between a blade driving lever 208 and a brake lever 213 in another conventional device shown in FIGS. 7 and 8 so that the shock due to abutment between the blade driving lever 208 and the brake lever 213 is reduced, the abutment occurring immediately before completion of the running of the blades.

In the description of the conventional device, some components which are substantially the same as those of the device according to an embodiment of the present invention to be described later will be illustrated by giving reference numerals to which 100 (in a case of FIGS. 5 and 6) or 200 (in a case of FIGS. 7 and 8) are added as an alternative to the detailed description of them.

However, in the sample shown in FIGS. 5 and 6, since both the blade driving lever 108 and the brake lever 113 are usually made of a metal, a large impact between two metallic parts is generated when the blade driving lever 108 which is driven at high speed is brought into abutment with the brake lever 113. As a result of such shock at the initial stage of stopping process, problems arise in that the durability of the blades can be deteriorated and/or uncomfortable high tone noise due to the metal impact will be generated.

Furthermore, in the example shown in FIGS. 7 and 8, although an advantage can be obtained in that the shock occurring at the initial stage of the stopping process can be absorbed and the high tone noise can be prevented thanks to the presence of the buffer member 224, a problem, on the contrary, arises in that the position at which the running of the blades is completed becomes unstable. Namely, the blade driving lever 208 is first brought into abutment with the brake lever 213 via the yielding buffer member 224. Next, the brake lever 213 is brought into abutment with the stopper rubber 218 with maintaining the state of abutment realized with the yielding buffer member 224 so that the final stop position of the blade driving lever 208 can be determined. As a result of the above-described structure, the deformations of two elastic members (the buffer member 224 and the stopper rubber 218) are added to each other, the two members being disposed at the intermediate positions of the passage through which force is transmitted. This will cause instability in determining the above-described position.

Such positional instability in completion of running of the shutter will sometimes cause a very serious problem in a shutter for cameras. For example, if the amount of deformation of the buffer member 224 is smaller than the amount estimated, the portion of the leading blade group in which slit is formed is remained in the aperture, causing a so-called "jump". In the trailing blade group, the portion in which slits are formed cannot drop but remains within the aperture, as a result of this, a problem arises in that a gap is formed. This leads to a non-uniform exposure, if the worst happens, it causes leak of light. On the other hand, if the amount of deformation of the buffer member 224 is larger than the amount estimated, the blade group overruns, causing for the structure of a parallel link mechanism which generally supports the blade group in such a manner that the blade group can run to be applied with excess force. It will cause deterioration in durability, and if in an extreme case, the structure can be destroyed.

Since the above-described buffer member 224 serves to absorb the action of impacting force, load at the time of action is relatively large with respect to the stopper rubber 218 which is engaged with the brake lever 213 for finally stopping the same after the brake lever 213 has been sufficiently decelerated. As a result of this, change in amount of deformation in accordance with time elapse is larger than that of the stopper rubber 218. Therefore, it is very difficult to control the proper amount of deformation through the overall time period for use, estimate the proper amount of deformation at the time of designing the device, and secure the precision of the components of the buffer member and accuracy of the components at assembly.

SUMMARY OF THE INVENTION

It is therefore an object of the present invention to provide a brake device for shutters in which stop of light shield member moving at high speed is conducted softly in the initial stage of stop process, while in the final stage of stop process, the positional accuracy of the light shield member can be improved and made stable.

BRIEF DESCRIPTION OF THE DRAWINGS

FIGS. 1 to 4 illustrate an example of the schematic structure of a focal plane shutter to which the present invention is applied, wherein:

FIG. 1 is a plan view of a leading blade driving system in a state where the preparation of running of shutter has been completed;

FIG. 2 is a plan view of the leading blade driving system in a state where the leading blade driving lever is abutted against a buffer member on the leading brake;

FIG. 3 is a plan view of the leading blade driving system in an operating state after abutment; and FIG. 4 is a plan view of the leading blade driving system in a state where the shutter has completed its running.

FIG. 7 and 8 illustrate the schematic structure of the conventional focal plane shutter in which the leading blade driving lever and the leading brake lever are brought into abutment with each other with a buffer member, in which:

FIG. 7 illustrates a state in which the first stage of the abutment; and

FIG. 8 illustrates a state in which running of the shutter has been completed.

DETAILED DESCRIPTION OF THE PREFERRED EMBODIMENT

An embodiment of the present invention will now be described with reference to the drawings.

FIGS. 1 to 4 illustrate a brake device for a shutter to which the present invention is applied, assuming that the brake device acts in the sequential order as illustrated.

Figure 5:
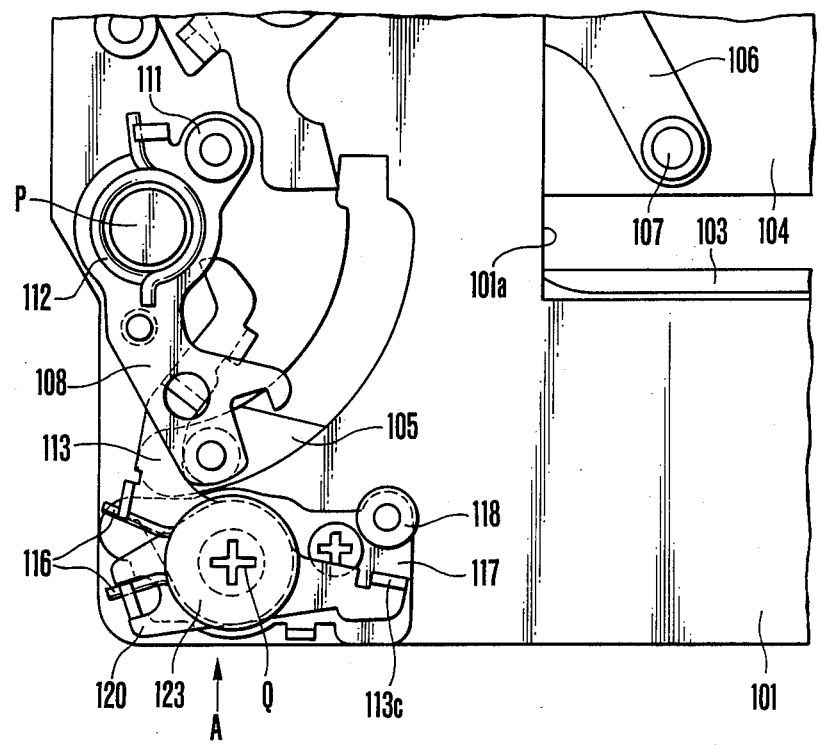
FIG. 5 illustrates an example of the schematic structure of the conventional focal plane shutter in which no buffer member is included.
Figure 6:
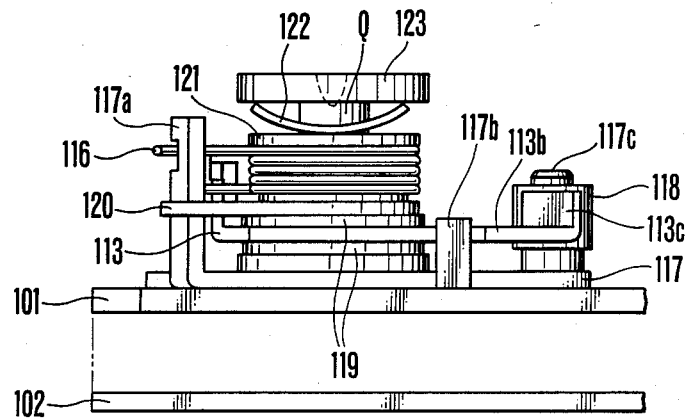
FIG. 6 is a cross-sectional view designated by an arrow A of FIG. 5.
Figure 7:
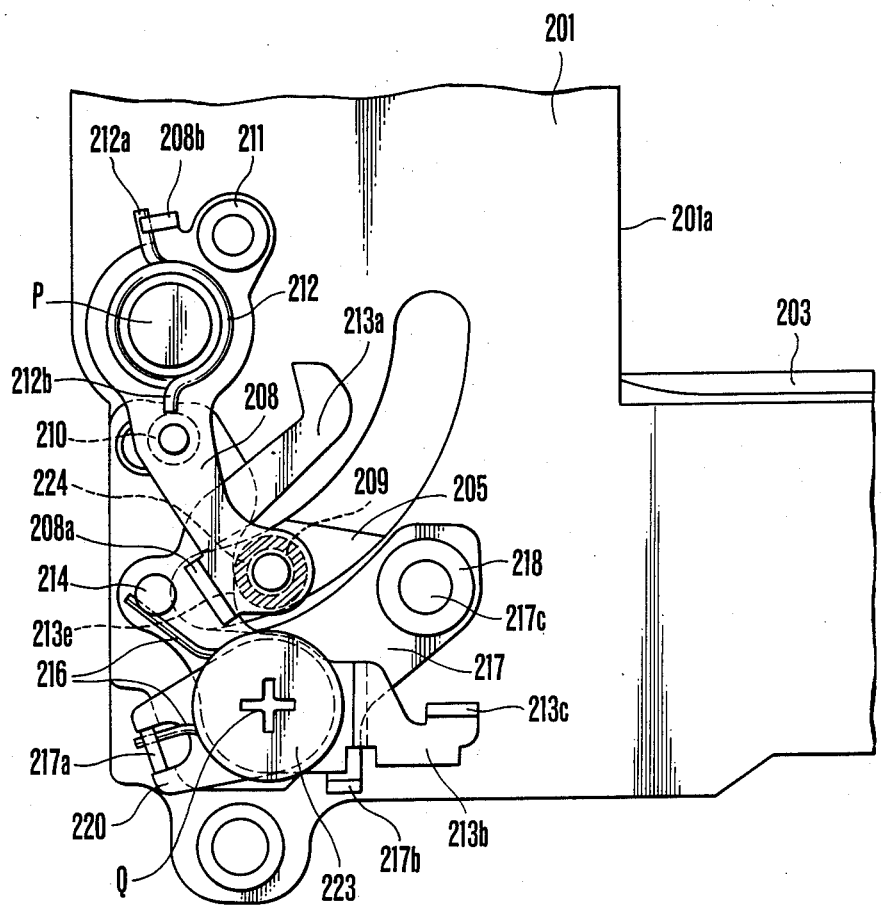
Figure 8:
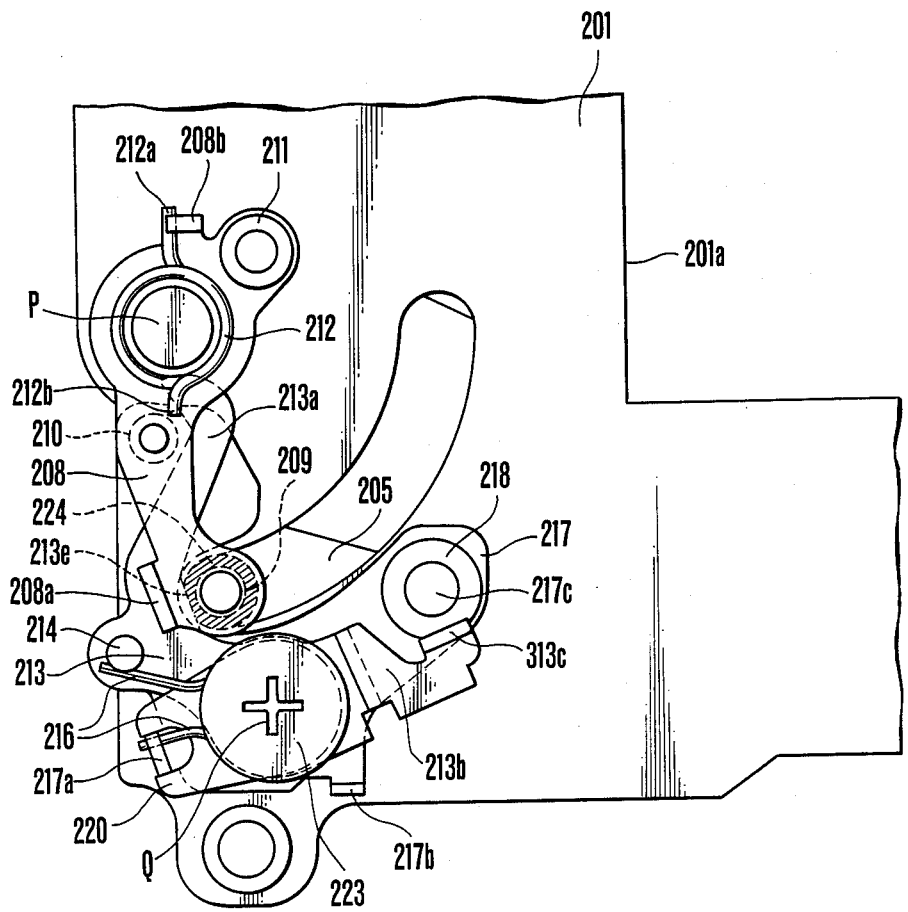

In these figures, a shutter base plate 1 is secured to the camera body and has at the central portion of a plane thereof an aperture 1a. A cover plate 102 (omitted from illustration in FIGS. 1 to 4), shown in the example in FIG. 6, is secured to the shutter base plate in such a manner as in the example shown in FIG. 6, the predetermined distance can be maintained. This cover plate 102 is formed an aperture (omitted from illustration) which corresponds to the above-described aperture 1a. A leading blade group 3 and a trailing blade group 4 are provided between the shutter base plate 1 and the cover plate 102 in a structural manner similar to the conventional one. The structure is constituted in such a manner that when the blade arms 5, 6 and a known link mechanism are operated, the aperture 1a is arranged to be opened and closed. The structure in which the above-described blade (for example, trailing blade group 4) and the blade arm (for example, the trailing blade arm 6) are rotatably connected is formed, similar to the conventional example shown in FIG. 5, with a blade dowel 7. Furthermore the structure of a blade unit including the leading blade group 3 and the trailing blade group is formed similar to the conventional structure without the characteristic structure of the brake device according to the present invention.

The mechanism for driving the blades and the brake device according to this embodiment is formed in structure in such a manner that the structure of the leading blade unit and that of the trailing blade unit are substantially formed in a similar manner. Therefore, the leading blade unit will be described hereinafter and the detailed description for the trailing blade unit will be omitted.

A leading blade driving lever 8 to serve as a blade driving member has a front end of rotation swing which is connected to the blade arm 5 by a metal pin 9 so that when the leading blade driving lever 8 is rotated clockwise, in this figure, round a shaft P, the leading blade group 3 is made a predetermined run to open the aperture 1a in the shutter base plate 1. As described above, these connections are constituted.

A spring force from a leading blade driving spring 12 wound onto the shaft P is urged to the leading blade driving lever 8 so that the leading blade driving lever 8 is clockwise, in the figure, rotated around the shaft P (by rotation of the blade driving lever 8, the leading blade group 3 runs in the direction causing the aperture 1a to be opened). The structure according to this embodiment to realize the above-described action is formed in such a manner that: the leading blade driving lever 8 is applied with the urging force in a case where a movable arm 12a at one end of the leading blade driving spring 12 is engaged with a bent and raised portion 8b of the leading blade driving lever 8, while a bent and raised portion 8a of the leading blade driving lever 8 is engaged with a leading latch lever (arresting member) (omitted from the illustration) so that the leading blade driving lever 8 is arrested at the position (the position shown in FIG. 1) where running is prepared (see FIG. 1).

A fixed arm 12b disposed at the other end of the leading blade driving spring 12 is supported by an adjusting mechanism (omitted from the illustration). Since this supporting position can be adjusted to vary, the structure in which the above-described urging force can be adjusted can be formed.

A pin 10 is embedded in the lower surface of the leading blade driving lever 8 (reverse side), and is disposed so as to set a leading blade brake lever 13 at the position at which it waits for being subjected to braking. A roller 11 is rotatably embedded in the leading blade driving lever 8, and is disposed so as to set the leading blade group 3 at the running preparation position in such a manner that the roller 11 is pushed by a cam of a charge lever (omitted from the illustration), causing the lever 8 to be charge-rotated counterclockwise.

A brake device according to this embodiment will now be described, this brake device stopping the action of the leading blade driving lever 8, that is, the action of the leading blade group 3, by way of acting in the final stage of rotation of the leading blade driving lever 8 when the leading blade driving lever 8 forming the above-described structure is rotated to make the leading blade group 3 run.

A leading brake lever 13 is rotatably disposed, with a predetermined rotational frictional resistance applied, around a shaft Q provided on the shutter base plate 1. The application of such rotational frictional resistance is realized by a sandwiching and holding structure similar to the conventional structure shown in FIG. 5, i.e., a brake lever 113 (this reference numeral corresponds to reference numeral 13 in this embodiment, to be the same hereinafter), leading brake base plate 117 (17 in this embodiment), brake sheet 119 (omitted from illustration in this embodiment), fixed plate 120 (20 in this embodiment), spring 116 (16 in this embodiment), collar 121 (omitted from illustration in this embodiment), leaf spring 122 (omitted from illustration), screw 123 (23 in this embodiment) and the like.

This leading brake lever 13 is provided with: an arm portion 13a having an abutment portion 13e which receives kinetic energy due to running of the leading blade group 3 by way of being brought into abutment with the pin 9 of the leading blade driving lever 8; an arm portion 13b having a bent and raised portion 13c which determines the final stoppage position by way of being brought into abutment with a stopper rubber 18 at the time of completion of the leading blade group 3 with a buffer action of the stopper rubber 18 applied to the bent and raised portion 13c; and a pin 14 with which a spring 16 is engaged. The spring 16 has two functions of generating a sub-braking force when the leading blade driving lever 8 is being applied with the braking action, and generating a force for returning the leading brake lever 13 at the time of shutter charging.

A buffer member 15 is secured to the outer surface of the pin 14, and is, in this embodiment, made of rubber (or an elastic material such as plastic). This buffer member 15 is constituted in such a manner that the bent and raised portion 8a of the leading blade driving lever 8 is brought into abutment with the buffer member 15 immediately before completion of running of the leading blade group 3.

A leading brake base plate 17 is secured to the shutter base plate 1, and is provided with the shaft Q, a bent and raised portion 17a for supporting the fixed arm of the spring 16, a bent and raised portion 17b which determines the maximum positional limit of the leading brake lever 13 at the time of shutter charging, and a shaft 17c for fixedly securing the stopper rubber 18.

A holding screw 23 holds a brake plate spring (omitted from illustration) in order to apply a frictional force to the leading brake lever 13 for realizing frictional rotation by way of elastically deforming the brake plate spring. As described above, the structures of the brake sheet and the brake plate spring and the like which are omitted from the illustration in FIGS. 1 to 4 are substantially the same as those shown in FIG. 6. The structure of a trailing blade unit is constituted in the same manner as that of the above-described leading blade unit.

An operation of the thus-constituted shutter according to this embodiment, and particularly an operation of the brake device of the same will now be described.

Figure 1:
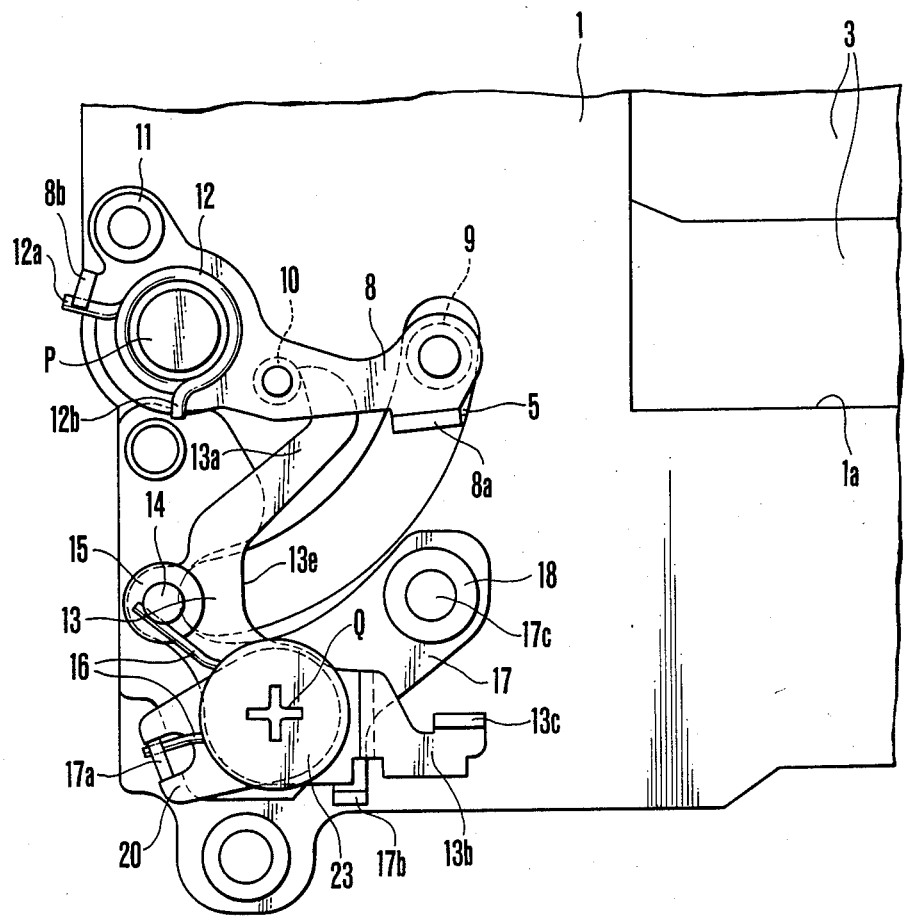

FIG. 1 illustrates a state where the shutter is waiting for its running.

In a state illustrated, it is assumed that a signal representing start of operation is supplied to a leading blade controlling magnet (omitted from illustration) which is provided for a camera for controlling a shutter time. As a result of receipt of the signal representing start of operation, the leading latch lever (omitted from illustration) (member arresting, as described above, the leading blade driving lever 8) releases the leading blade driving lever 8.

As a result of this, the leading blade driving lever 8 is clockwise, in this figure, rotated round the shaft P by the urging force applied by the leading blade driving spring 12 so that the leading blade group 3 is made run to open the aperture 1a.

After a proper time delay arranging a predetermined timing from beginning of running of the leading blade group 3, the trailing blade group 4 starts running to close the aperture 1a.

After the leading blade group 3 has started running in the state shown in FIG. 1, the bent and raised portion 8a of the leading blade driving lever 8 is first brought into abutment with a certain shock with the buffer member 15 provided on the leading brake lever 13 (see FIG. 2) when the running of the leading blade group 3 approaches its final position. However, since the buffer member 15 which is the corresponding component of this abutment is made of an elastic material, the shock can be absorbed and reduced by means of deformation of the buffer member 15 in comparison to the metal impact described in the conventional example shown in FIG. 5.

Figure 2:
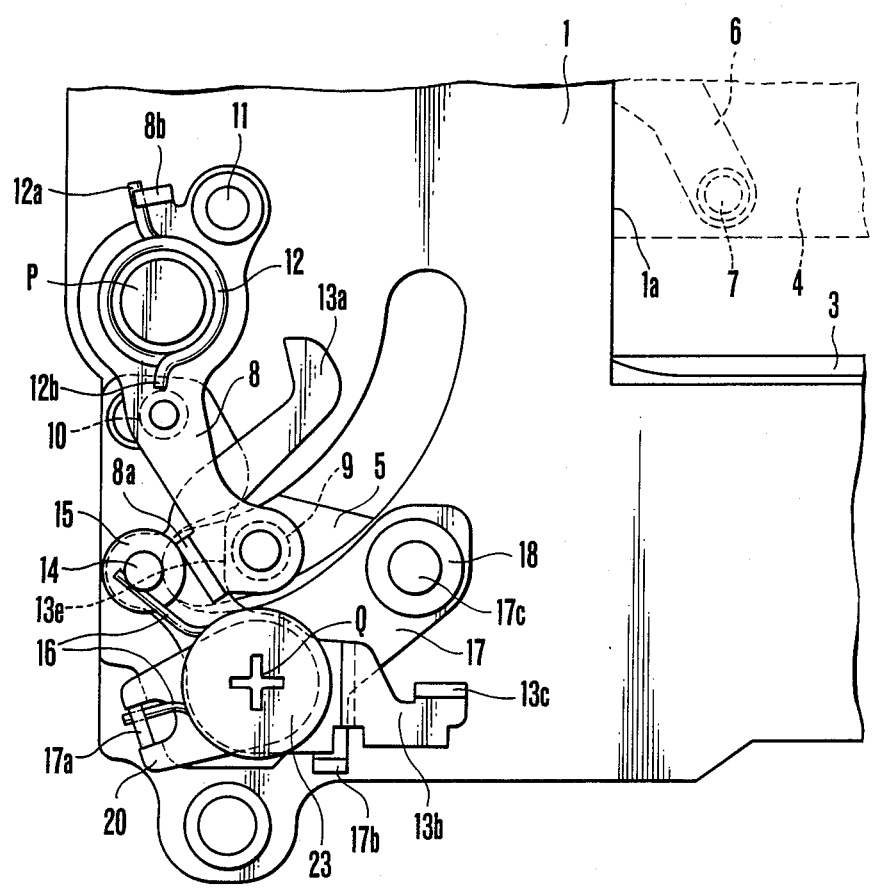

In a state shown in FIG. 2, the rotation of the leading blade driving lever 8 around the shaft of P is further propagated with the buffer member 15 pushed by the bent and raised portion 8a. In this case, the leading brake lever 13 is rotated counterclockwise around the shaft Q according to the rotation of the leading driving lever 8. As described above, since the structure is formed in such a manner that the rotation of the leading brake lever 13 is arranged to be a frictional rotation (spring force of the spring 16 also acts), the rotation of the leading blade driving lever 8 is gradually restricted in accordance with the rotation of the leading brake lever 13.

In accordance with the propagation of rotation of the two components (the leading blade driving lever 8 and the leading brake lever 13) in the opposite direction each other, the leading blade group 3 further runs to approach its completion position. In accordance with this, the degree of abutment between the bent and raised portion 8a of the leading blade driving lever 8 and the buffer member 15 is gradually weakened, and simultaneously, the pin 9 embedded in the front portion of the leading blade driving lever 8 is brought into abutment with the abutment portion 13e provided in the leading brake lever 13 (see FIG. 3). Although the engagement between this pin 9 and the abutment portion 13e is the rigid engagement between two metals in this embodiment, the crashing sound cannot be generated in this rigid engagement because the rotation of the leading blade driving lever 8 is restricted to a considerable degree at the time of this engagement, and furthermore because this rigid engagement is achieved with the two components according to this embodiment being rotated in the opposite direction each other. The angular extent of rotation of the leading blade driving lever 8 occurring from abutment with the buffer member 15 of the leading blade driving lever 8 to the rigid engagement with the abutment portion 13e may be determined in the designing view point taking the material of the buffer member 15, allowance of size of the device and so on into consideration.

Figure 3:
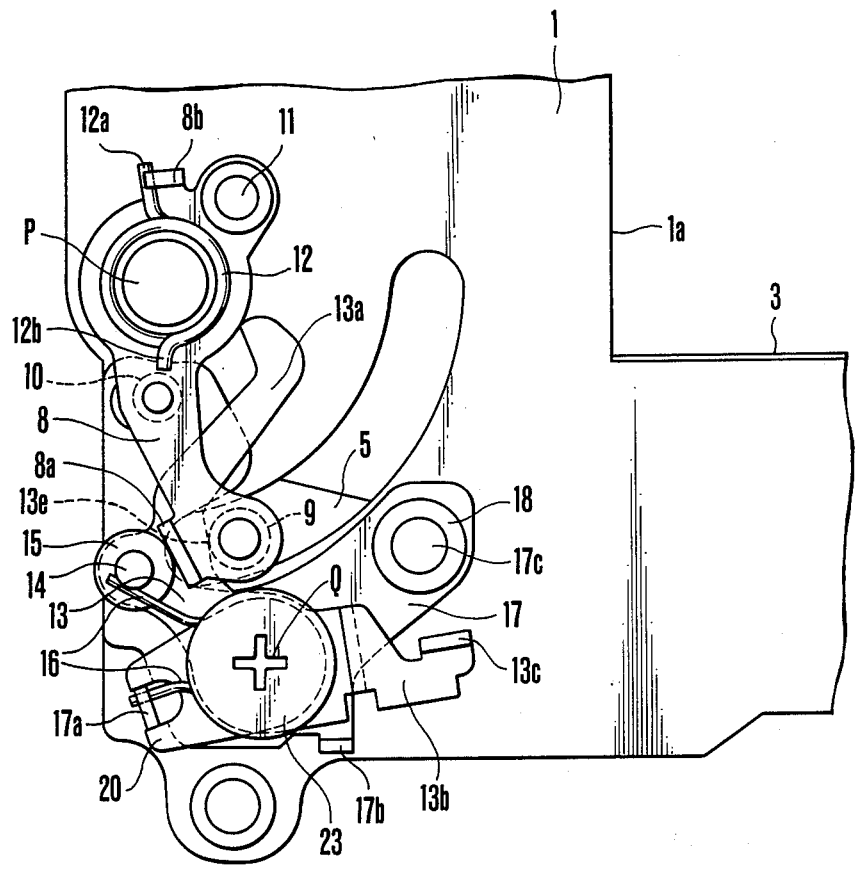
Figure 4:
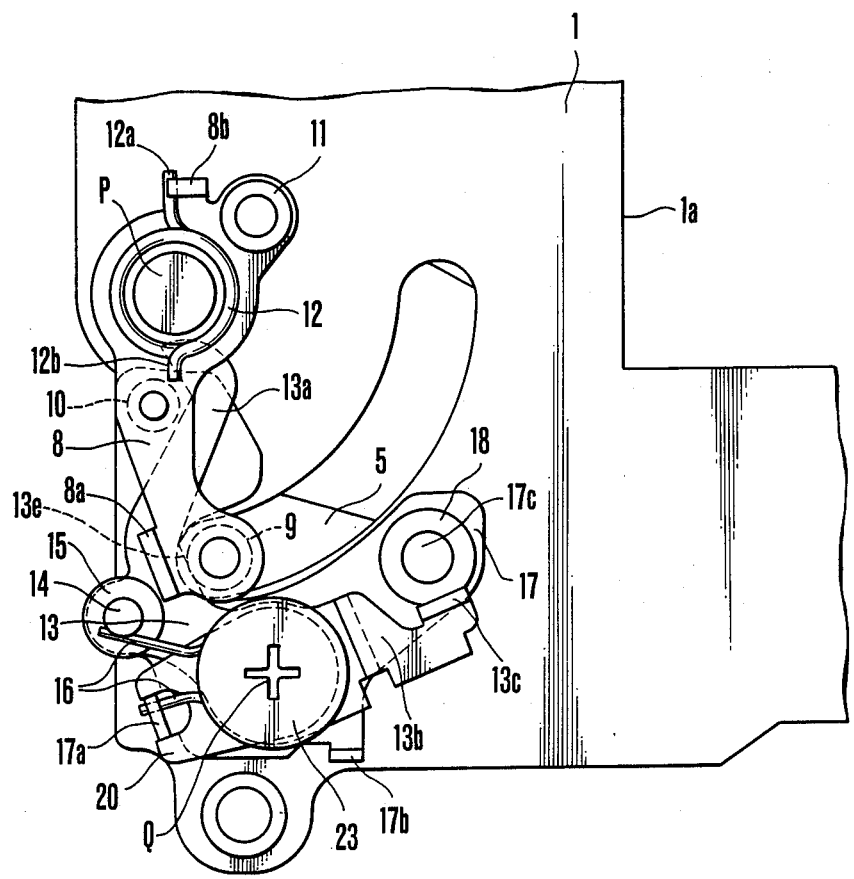

In the state shown in FIG. 3, the leading brake lever 13 is further frictionally rotated by the leading blade driving lever 8 with which the former is rigidly engaged, the rotation of the leading brake lever 13 braking the leading blade driving lever 8. The rotation is stopped at the final position at which running of the leading blade group 3 is completed with the bent and raised portion 13c being brought into abutment with the stopper rubber 18 (see FIG. 4). In this embodiment, the positions of the buffer member 15 and the bent and raised portion 8a of the leading blade driving lever 8 are determined in such a manner that the abutment between these two parts is released by the rotation before the final stoppage of the leading brake lever 13.

As described above, the running of the leading blade group 3 is stopped in a state where the leading brake lever 13 has elastically deformed the stopper rubber 18 to a certain extent. Since this deformation of the stopper rubber 18 is generated in a state where the rotation of the leading brake lever 13 has been restricted to a considerable degree, amount of deformation due to time elapse will be reduced.

Braking of the trailing blade group 4 is conducted similarly.

As described above, the blade groups are braked in this embodiment in such a manner that the soft abutment is realized by the elastic member in the initial stage of braking process of the blade group which is being running at high speed, causing an effect to be obtained in that defects due to crashing abutment to be prevented, while in the final stage of the braking process, rigid abutment between two metal parts is conducted, causing an effect to be obtained in that precise and stable positioning can be realized.

This invention is not limited to the description for the above described embodiment. Other structures may be, of course, employed within the scope of this invention. For example, although in the above-described embodiment, an elastic material such as rubber or plastic is employed to form the buffer member, materials such as vibration absorbing metals, hard plastic, brass or the like may be employed which is softer than the material of the portion to be brought into abutment with the blade driving lever and the brake lever.

As an alternative to the structure in this embodiment in which the buffer member is disposed on the brake lever, it may be disposed on the blade driving lever, or another member may be individually provided.

According to this embodiment, the abutment between the blade driving lever and the brake lever which is a crash between two metal parts in the conventional art is conducted in such a manner that a buffer member is interposed between the two parts in the initial stage of the abutment process. Furthermore, during the braking process, this abutment is smoothly changed to a contact between two metal parts. The characteristics of this invention lies in that the following effects can be obtained: large shock involved in the initial stage of the braking process can be absorbed, causing the durability of components to be improved, and causing uncomfortable operating sound to be reduced.

Furthermore, at the time of completion of running of the blades, the position at which the running of the blade lever is completed is determined by the blade driving lever, brake lever and the stopper rubber which is to be brought into abutment with and is secured to the brake lever. Since this positioning is conducted without the buffer member, another effect can be obtained in that positioning can be conducted precisely and stably against time elapse. Consequently, the position at which the running of the blades can be stably determined, causing unfavorable affection to exposure to be prevented from occurrence.

What is claimed is:

1. A brake device for a shutter comprising:
   (a) a movable member which moves in association with the running of shutter blades, said movable member being capable of being braked to brake the running of said shutter blades; and
   (b) a brake member which is moved in a following manner by said movable member and which conducts braking, including:
   (b—1) a first contact portion which is elastically brought into contact with said movable member; and
   (b—2) a second contact portion which is rigidly brought into contact with said movable member after said elastic contact of said first contact portion has started.

2. A device according to claim 1, wherein said movable member is a driving lever which drives said shutter blades.

3. A device according to claim 1, wherein said first contact portion is provided with a buffer member.

4. A device according to claim 2, wherein said driving lever starts contact with said first contact portion of said brake member at the final stage of rotation of said driving lever;
   said driving lever is brought into contact with said second contact portion after start of contact with said first contact portion;
   said contact between said second contact portion and said driving lever continues until a final rotational stroke of said driving lever; and
   said contact between said first contact portion and said driving lever is released before said driving lever reaches the final rotational stroke.

5. A device according to claim 4, further comprising:
   a stopper which is brought into contact with said brake member at the position corresponding to the final rotational stroke of said driving lever.

6. A brake device for a shutter, comprising:
   (a) a movable member which moves in association with the running of shutter blades, said movable member being capable of being braked to brake the running of said shutter blades; and
   (b) a brake mechanism which conducts braking of said movable member, including:
   (b—1) a first contact portion which is brought into elastically contact with said movable member to be moved for a predetermined distance; and
   (b—2) a second contact portion which is brought into rigidly contact with said movable member to be moved for a predetermined distance after said contact of said first contact portion has started.

7. A device according to claim 6, wherein said movable member is a driving lever which drives said shutter blades.

8. A device according to claim 6, wherein said first contact portion is provided with a buffer member.

9. A device according to claim 7, wherein said driving lever starts contact with said first contact portion at the final stage of rotation of said driving lever;
   said driving lever is brought into contact with said second contact portion after start of contact with said first contact portion;
   said contact between said second contact portion and said driving lever continues until a final rotational stroke of said driving lever; and
   said contact between said first contact portion and said driving lever is released before said driving lever reaches the final rotational stroke.

* * * * *

UNITED STATES PATENT AND TRADEMARK OFFICE
CERTIFICATE OF CORRECTION

PATENT NO. : 4,847,649        Page 1 of 2

DATED : July 11, 1989

INVENTOR(S) : Toyoda, et al.

It is certified that error appears in the above-identified patent and that said Letters Patent is hereby corrected as shown below:

<u>COLUMN 1</u>:

Line 17, "made run." should read --made to run--.

<u>COLUMN 3</u>:

Line 36, "plate" should read --plate 1--; and

Line 37, "the" (second occurrence) should read --that--.

<u>COLUMN 6</u>:

Line 19, "each" should read --to each--; and

Line 36, "each" should read --to each--.

<u>COLUMN 7</u>:

Line 5, "running" should read --run--;

Line 6, "defects" should read --defect--; and

Line 42, "lever" should read --driving lever--.

UNITED STATES PATENT AND TRADEMARK OFFICE
CERTIFICATE OF CORRECTION

PATENT NO. : 4,847,649

DATED : July 11, 1989

INVENTOR(S) : Toyoda, et al.

It is certified that error appears in the above-identified patent and that said Letters Patent is hereby corrected as shown below:

COLUMN 8:

Line 38, "elastically" should read --elastic--; and

Line 41, "rigidly" should read --rigid--.

Signed and Sealed this

Thirty-first Day of July, 1990

Attest:

HARRY F. MANBECK, JR.

Attesting Officer

Commissioner of Patents and Trademarks